US012492799B2

(12) United States Patent
Matsuoka et al.

(10) Patent No.: US 12,492,799 B2
(45) Date of Patent: Dec. 9, 2025

(54) LIGHTING FIXTURE FOR VEHICLE

(71) Applicant: Ichikoh Industries, Ltd., Isehara (JP)

(72) Inventors: Kenji Matsuoka, Isehara (JP); Kunihiro Shimizu, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/247,202

(22) PCT Filed: Sep. 29, 2021

(86) PCT No.: PCT/JP2021/035962
§ 371 (c)(1),
(2) Date: Mar. 29, 2023

(87) PCT Pub. No.: WO2022/071432
PCT Pub. Date: Apr. 7, 2022

(65) Prior Publication Data

US 2023/0383922 A1 Nov. 30, 2023

(30) Foreign Application Priority Data

Sep. 30, 2020 (JP) ................................ 2020-165627

(51) Int. Cl.
*F21S 45/48* (2018.01)
*F21S 41/143* (2018.01)
*F21S 41/19* (2018.01)

(52) U.S. Cl.
CPC ............. *F21S 45/48* (2018.01); *F21S 41/143* (2018.01); *F21S 41/192* (2018.01)

(58) Field of Classification Search
CPC ........ F21S 41/192; F21S 41/151; F21S 41/19; F21S 43/14; F21S 45/48; F21S 43/195;
(Continued)

(56) References Cited

U.S. PATENT DOCUMENTS 7,922,364 B2 4/2011 Tessnow et al.
8,967,843 B2 3/2015 Jackl et al.
2010/0128479 A1* 5/2010 Biebl ...................... F21V 29/80 362/249.02

FOREIGN PATENT DOCUMENTS

CN 105042468 A 11/2015
JP 2009-146706 A 7/2009
(Continued)

OTHER PUBLICATIONS

International Search Report mailed on Nov. 22, 2021 in PCT/JP2021/035962 filed on Sep. 29, 2021 (2 pages).
(Continued)

*Primary Examiner* — William J Carter
(74) *Attorney, Agent, or Firm* — Oblon, McClelland, Maier & Neustadt, L.L.P.

(57) ABSTRACT

A lighting fixture for a vehicle efficiently releases heat from a light source while inhibiting moisture from entering the light source side. The lighting fixture includes: a light source; a heat dissipating member which dissipates heat from the light source, the light source being placed on an installation surface of the heat dissipating member; and a socket to which the heat dissipating member is attached. The heat dissipating member has a heat dissipating fin part protruding from a heat dissipating surface on the side opposite to the installation surface, and a heat dissipating-side positioning part (positioning projection) provided on the heat dissipating surface. The socket has, on an attachment surface, a fin recess into which the heat dissipating fin part fits, and a socket-side positioning part (positioning hole) which determines the positional relationship between the heat dissipating member and the socket in cooperation with the heat dissipating-side positioning part.

7 Claims, 10 Drawing Sheets

(58) Field of Classification Search
CPC .......... F21S 41/141; F21S 43/19; F21S 45/47; F21S 45/49
See application file for complete search history.

(56) References Cited

FOREIGN PATENT DOCUMENTS

| | | | | |
|---|---|---|---|---|
| JP | 2011-171277 | A | | 9/2011 |
| JP | 2011-253774 | A | | 12/2011 |
| JP | 2012084280 | A | * | 4/2012 |
| JP | 2013-219289 | A | | 10/2013 |
| JP | 2016-48607 | A | | 4/2016 |
| JP | 2017-152285 | A | | 8/2017 |
| JP | 2018-67451 | A | | 4/2018 |
| WO | 2013/153938 | A1 | | 10/2013 |

OTHER PUBLICATIONS

Office Action issued Apr. 9, 2024, in corresponding Japanese Patent Application No. 2020-165627 (with English Translation), 9 pages.

* cited by examiner

LIGHTING FIXTURE FOR VEHICLE

TECHNICAL FIELD

The present disclosure relates to a lighting fixture for a vehicle.

BACKGROUND ART

Lighting fixtures for vehicles are required to use a light source with high output and high luminance. For this reason, a lighting fixture for a vehicle that efficiently releases heat from the light source has been proposed (for example, see PTL 1).

In such a lighting fixture for a vehicle, a plurality of fins are provided in a heat dissipating member, to which a substrate on which a light source is mounted is attached, and a connector part (socket) is combined with the heat dissipating member by insert molding so as to fill the space between the fins. As a result, in such a lighting fixture for a vehicle, the fins and the connector part can be appropriately joined, and the heat from the light source can be efficiently released from the heat dissipating member through the connector part.

CITATION LIST

Patent Literature

PTL 1: Japanese Patent Application Publication No. 2011-253774

SUMMARY OF THE INVENTION

Problems to be Solved by the Invention

However, in the lighting fixture for a vehicle described above, in order to arrange the heat dissipating member provided with the plurality of fins in an appropriate position inside a mold during insert molding, it is necessary to provide a support member that provides support inside the mold from the side in which the fins are provided. For this reason, in the lighting fixture for a vehicle described above, a through hole that passes through from the side on which the fins of the heat dissipating member are provided to the outside is formed in the connector part at the site in which the support member is pulled out. Here, in the lighting fixture for a vehicle described above, when the through hole mentioned above is formed in the connector part, the heat dissipating member including the fins (the periphery thereof) becomes an air passage between the outside and the side of the connector part on which the substrate, that is, the light source, is arranged (light source side). As a result, in the lighting fixture for a vehicle described above, there is a possibility that moisture may enter through the through hole on the light source side, that is, through the space in which the light source and the like are provided, and there is room for improvement.

The present disclosure has been made in view of the circumstances above, and has an object of providing a lighting fixture for a vehicle which efficiently releases heat from a light source while inhibiting moisture from entering on the light source side.

Means for Solving the Problem

A lighting fixture for a vehicle of the present disclosure includes: a light source; a heat dissipating member which dissipates heat from the light source, the light source being placed on an installation surface of the heat dissipating member; and a socket to which the heat dissipating member is attached; wherein the heat dissipating member is provided with a heat dissipating fin part protruding from a heat dissipating surface on a side opposite to the installation surface, and a heat dissipating-side positioning part provided on the heat dissipating surface, and the socket is provided with, on an attachment surface facing the heat dissipating surface, a fin groove part into which the heat dissipating fin part fits, and a socket-side positioning part which determines a positional relationship between the heat dissipating member and the socket in cooperation with the heat dissipating-side positioning part.

Effect of the Invention

According to the lighting fixture for a vehicle of the present disclosure, it is possible to efficiently release heat from a light source while inhibiting moisture from entering on the light source side.

MODE FOR CARRYING OUT THE INVENTION

Figure 1:
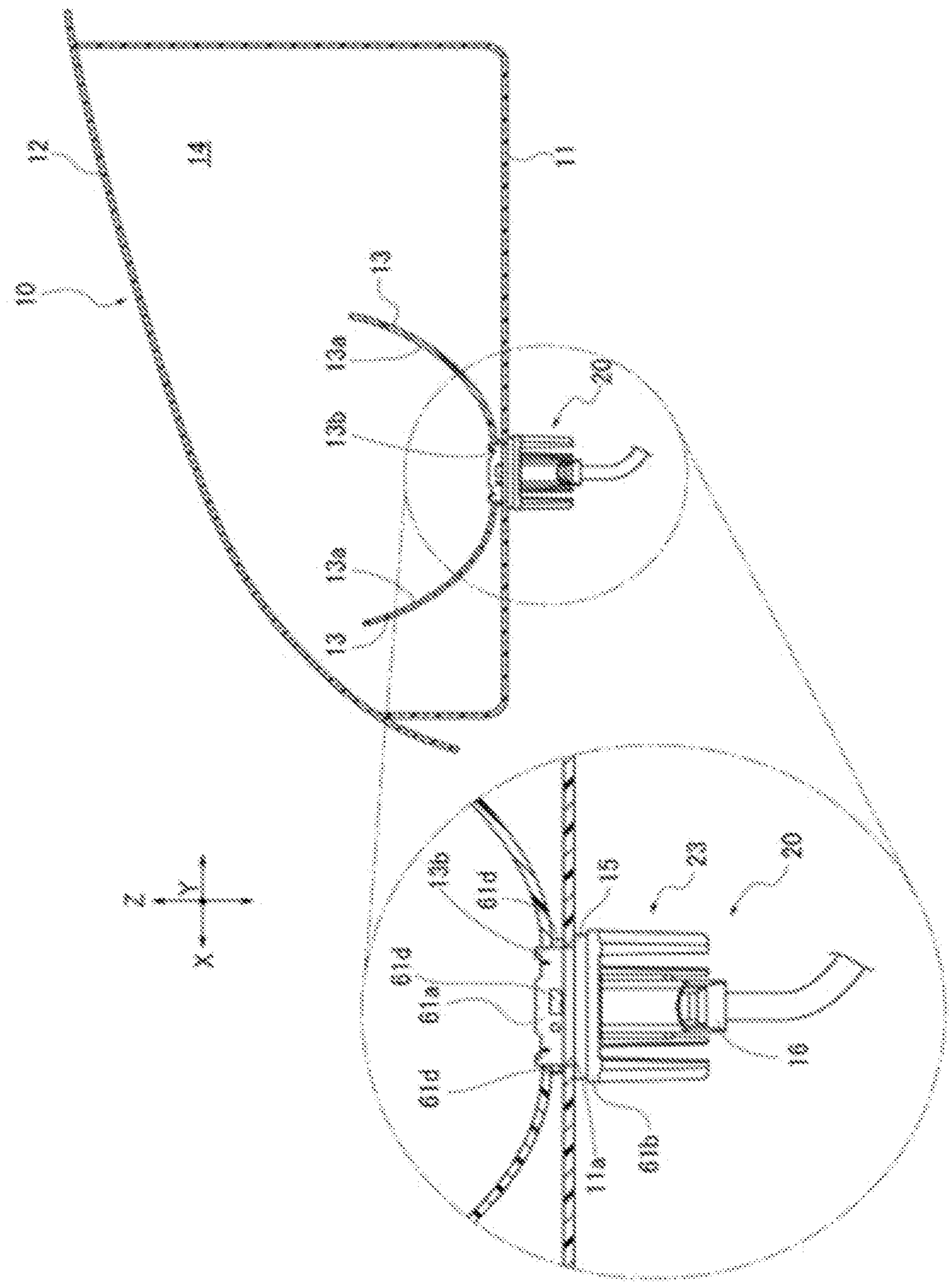
FIG. 1 is an explanatory diagram showing a lighting fixture for a vehicle of a first embodiment as a lighting fixture for a vehicle according to the present disclosure.

Hereinafter, embodiments of lighting fixture 10 for a vehicle, which is an example of a lighting fixture for a vehicle according to the present disclosure, will be described below with reference to the drawings.

First Embodiment

The lighting fixture 10 for a vehicle of a first embodiment, which is an embodiment of a lighting fixture for a vehicle according to the present disclosure, will be described using FIGS. 1 to 6. The lighting fixture 10 for a vehicle according to the first embodiment is used as a lighting fixture of a vehicle such as an automobile, and is used, for example, as a headlamp, a fog lamp, a daytime running lamp, or a clearance lamp. In the following description, in the lighting fixture 10 for a vehicle, the direction of travel of a vehicle traveling straight ahead, which is the direction in which light is emitted, is referred to as the optical axis direction (the Z-direction in the drawings, with the irradiation direction being the front side), the up-down direction when installed in the vehicle is referred to as the up-down direction (the Y-direction in the drawings), and the direction orthogonal to the optical axis direction and the up-down direction is referred to as the width direction (the X-direction in the drawings).

As shown in FIG. 1, the lighting fixture 10 for a vehicle includes a lamp housing 11, a lamp lens 12, a reflector 13, and a light source unit 20. The lamp housing 11 is formed of an optically opaque member such as a colored or painted resin material, and has a hollow shape with an open front side and a closed rear side. The lamp housing 11 is provided with an attachment hole 11*a* that penetrates through the closed rear end. A plurality of notch parts and stopper parts are provided at substantially equal intervals on the edge of the attachment hole 11*a*.

The lamp lens 12 is made of an optically transparent member such as a transparent resin material or a glass member, and has a shape capable of covering the open front end of the lamp housing 11. The lamp lens 12 is fixed in the opening part of the lamp housing 11 in a sealed state to ensure watertightness. A lamp chamber 14 is defined by the lamp housing 11 and the lamp lens 12.

The reflector 13 is a light distribution control part that controls the light distribution of the light emitted from the light source unit 20, and is fixed to the lamp housing 11 or the like and arranged inside the lamp chamber 14. The reflector 13 has a curved shape with a focal point in the vicinity of the light source 21 of the light source unit 20 (see FIG. 2 and the like), and the inner surface is a reflecting surface 13*a* that reflects light, and an attachment hole 13*b* is provided at the bottom part. The attachment hole 13*b* has a positional relationship that communicates with the attachment hole 11*a* of the lamp housing 11 when the reflector 13 is arranged inside the lamp chamber 14. In the first embodiment, although the reflector 13 is formed as a separate member from the lamp housing 11, an integrated configuration, that is, a configuration in which the inside surface of the lamp housing 11 is a reflecting surface is possible, and other configurations not limited to the configuration of the first embodiment are also possible. Furthermore, a light guide member may be provided instead of the reflector (reflecting surface) on the front side of the light source unit 20 in the optical axis direction to emit light in a region having a different position or a different size from the light source 21, and the configuration is not limited to the configuration of the first embodiment. Even when such a light guide member is provided, the lighting fixture 10 for a vehicle can be used as, for example, a headlamp, a fog lamp, a daytime running lamp, a clearance lamp, or the like.

The light source unit 20 is arranged in the lamp chamber 14 by being passed through the attachment hole 11*a* of the lamp housing 11 and the attachment hole 13*b* of the reflector 13. The light source unit 20 has a sealing member (O-ring) 15 interposed in the space between it and the lamp housing 11, and is detachably attached to the attachment hole 11*a*. The light source unit 20 may be provided in the lamp chamber 14 via an up-down direction optical axis adjustment mechanism or a left-right direction optical axis adjustment mechanism.

Figure 2:
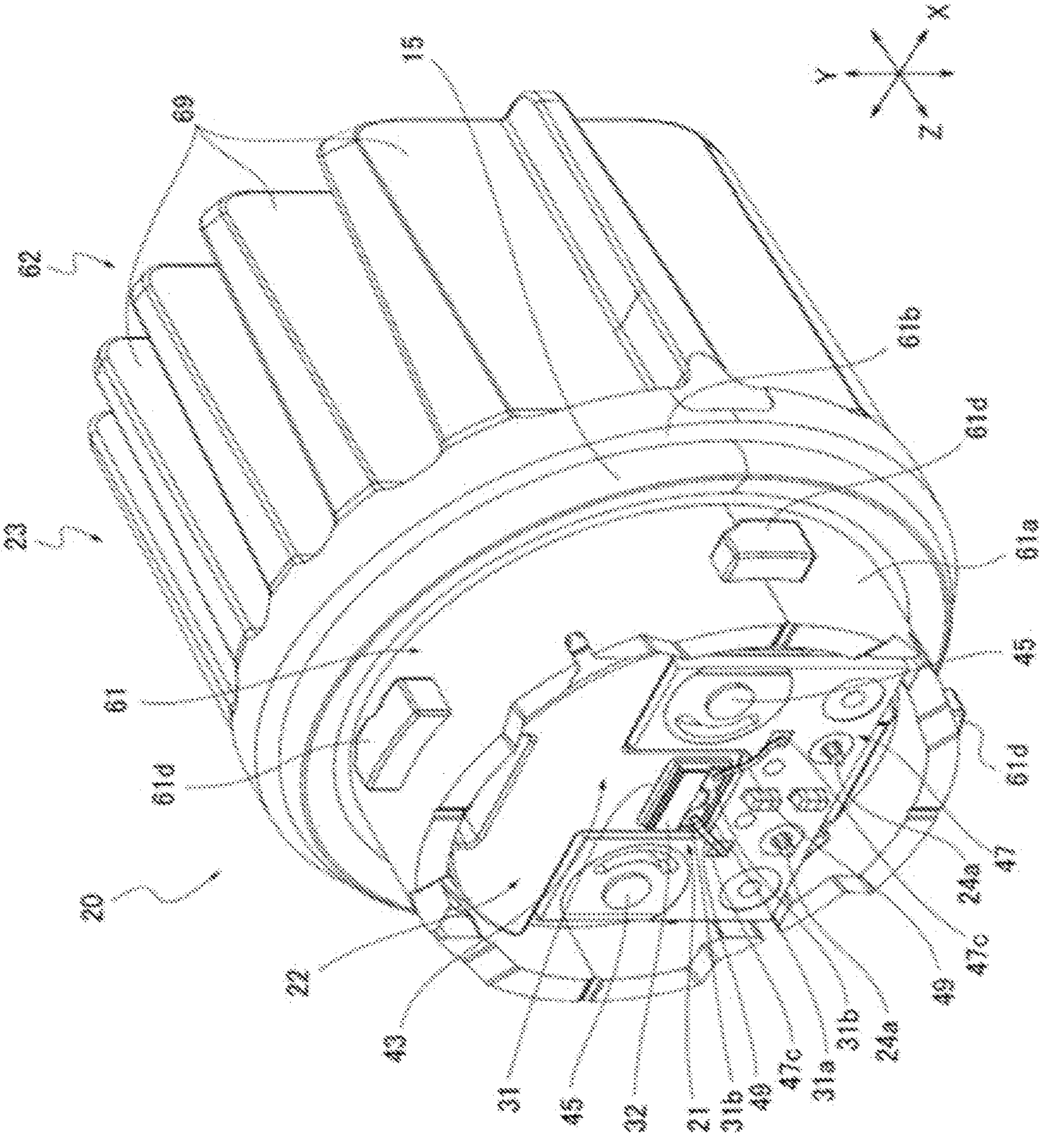
FIG. 2 is an explanatory diagram showing a light source unit of the lighting fixture for a vehicle.
Figure 3:
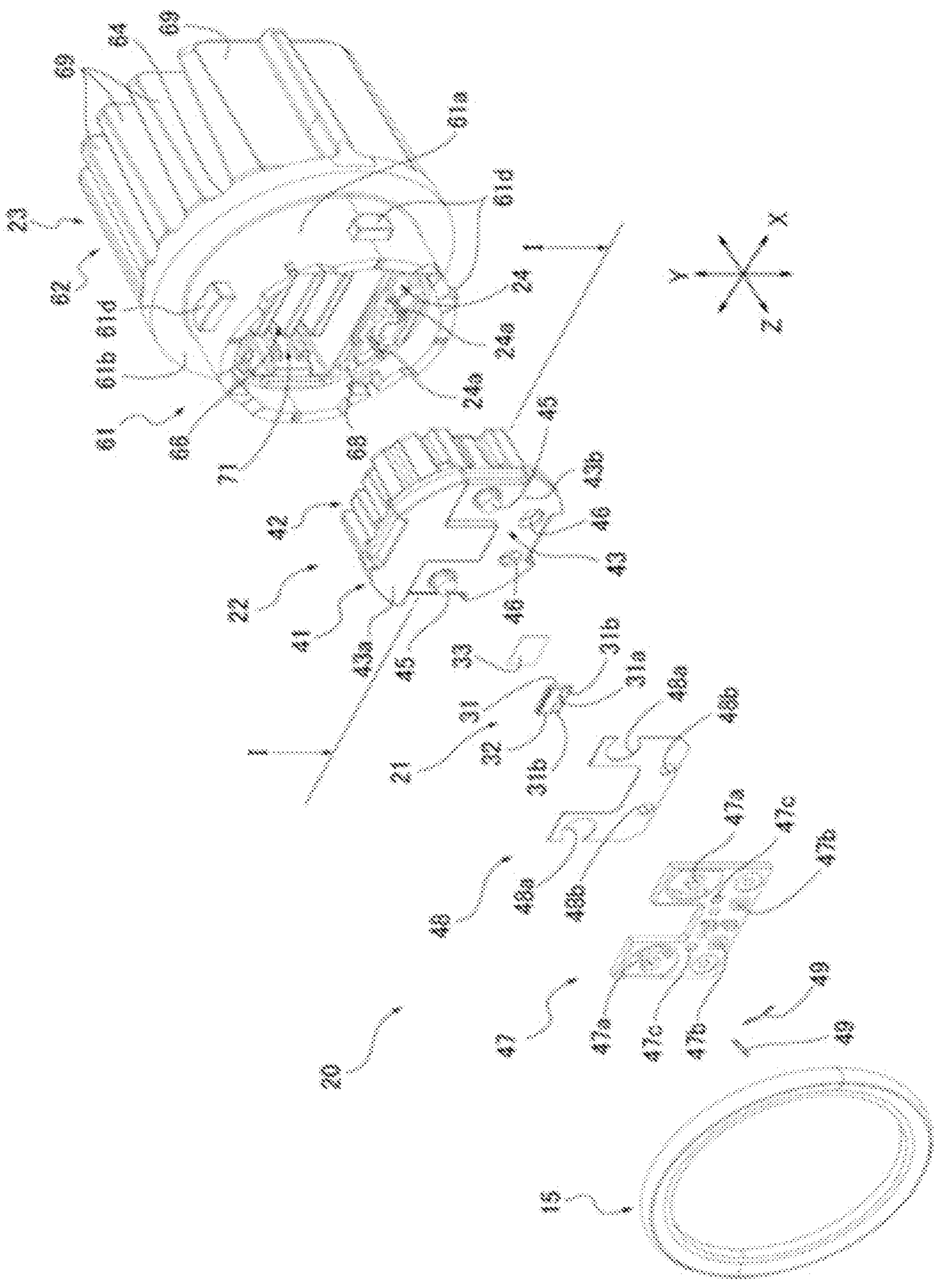
FIG. 3 is an explanatory diagram showing an exploded view of the configuration of the light source unit.

As shown in FIGS. 2 and 3, the light source unit 20 includes a light source 21, a heat dissipating member 22, a socket 23, and a power supply member 24. The light source 21 is formed as a sub-mount type light-emitting element in which a light-emitting chip 32 is provided on a sub-mount substrate 31. The attachment surface 31*a* of the sub-mount substrate 31 has a substantially rectangular shape when viewed from the front side in the optical axis direction, has the light-emitting chip 32 mounted on the upper half when viewed from the front in FIG. 2, and is provided with connection terminals 31*b* in the two lower corners to form a pair. In the light source 21, the light-emitting chip 32 and both of the connection terminals 31*b* are electrically connected via the sub-mount substrate 31 (an electric circuit thereof), and the light-emitting chip 32 is illuminated when power is supplied between both of the connection terminals 31*b*.

The light-emitting chip 32 is a self-luminous semiconductor-type light source such as an LED (light-emitting diode) or an EL (organic EL) LD chip (laser diode chip), and is an LED chip in the first embodiment. The light-emitting chip 32 is located near the focal point of the reflector 13 when the light source unit 20 assembled.

Figure 4:
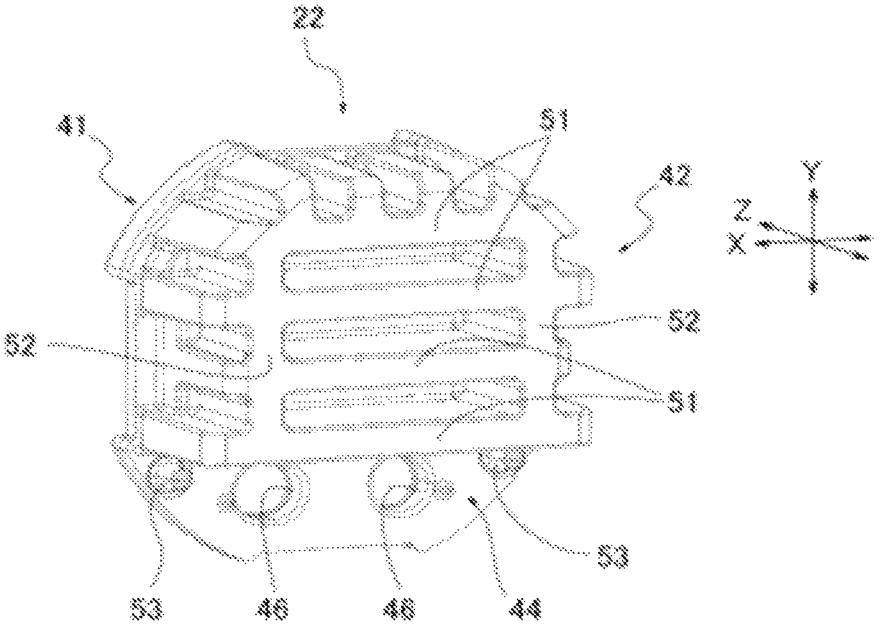
FIG. 4 is an explanatory diagram showing a heat dissipating member of the light source unit when viewed from the heat dissipating surface side.

The heat dissipating member 22 is a heat sink member that transfers (releases) the heat generated by the light source 21 to the socket 23, and is formed of a metallic material or resin material with a high thermal conductivity, and among metal die castings, is formed of an aluminum die casting in the first embodiment. As shown in FIGS. 3 and 4, the heat dissipating member 22 includes a base part 41 and a heat dissipating fin part 42. The base part 41 has a plate shape orthogonal to the optical axis direction, and the front side in the optical axis direction is an installation surface 43, and the opposite side (the rear side in the optical axis direction) is a heat dissipating surface 44 that is continuous with the heat dissipating fin part 42. The installation surface 43 is provided with a convex surface part 43*a* relatively protruding toward the front side in the optical axis direction, and a concave surface part 43*b* relatively recessed toward the rear side in the optical axis direction. The convex surface part 43*a* has a letter-T shape that includes a central region of the installation surface 43, and the light source 21 is installed in the central region. The light source 21 is attached to the convex surface part 43*a* (the central region thereof) via an adhesive layer 33 having thermal conductivity. The adhesive layer 33 attaches the light source 21 (the sub-mount substrate 31 thereof) to the convex surface part 43*a*, and may be made of a material such as an epoxy-based resin adhesive, a silicon-based resin adhesive, or an acrylic-based resin adhesive, and may be in liquid form, fluid form, tape form, or the like.

The concave surface part 43*b* has a letter-U shape that surrounds the portion of the convex surface part 43*a* to which the light source 21 is attached, and is provided with a pair of caulking projections 45 and a pair of terminal holes 46. Both of the caulking projections 45 are cylindrical and protrude from the concave surface part 43*b* in the optical axis direction, and are provided to form a pair so as to sandwich the light source 21 in the width direction. The caulking projections 45 are provided on the same straight line in the optical axis direction as connecting fins 52 described later (see FIG. 6). Both of the terminal holes 46 are through holes penetrating the base part 41, and pin terminals 24*a* of the power supply member 24 are capable of being passed therethrough.

A circuit board 47 is provided on the concave surface part 43*b*. The circuit board 47 transmits a control signal from a control circuit mounted on the vehicle to the light source 21, and is provided with a plurality of elements such as capacitors as appropriate. The circuit board 47 is a plate member having a shape that fits in the concave surface part 43*b*, that is, having a letter-U shape that surrounds the portion of the convex surface part 43*a* to which the light source 21 is attached, and has a height position that is substantially equal to that of the convex surface part 43*a* in the optical axis direction when provided on the concave surface part 43*b*.

The circuit board 47 is provided with a pair of caulking holes 47*a*, a pair of terminal connection holes 47*b*, and a pair of connection terminals 47*c*. Both of the caulking holes 47*a* are through holes that penetrate the circuit board 47 in the optical axis direction, and form a pair so as to sandwich the light source 21 in the width direction. The caulking holes 47*a* are provided in positions corresponding to the pair of caulking projections 45 provided on the concave surface part 43*b* of the heat dissipating member 22, and are capable having the corresponding caulking projections 45 passed therethrough. The terminal connection holes 47*b* are through holes that penetrate the circuit board 47 in the optical axis direction, are provided in positions corresponding to the pair of terminal holes 46 provided in the concave surface part 43*b* of the heat dissipating member 22, and the pin terminals 24*a* of the power supply member 24 are capable of being passed therethrough. The terminal connection holes 47*b* are electrically connected to the control circuit of the circuit board 47, and are electrically connected to the power supply member 24 as a result of the corresponding pin terminals 24*a* being fixed with solder or the like. Both of the connection terminals 47*c* are provided in positions corresponding to the connection terminals 31*b* on the attachment surface 31*a* of the sub-mount substrate 31, and are electrically connected to the control circuit formed on the circuit board 47.

The circuit board 47 is attached to the concave surface part 43*b* via an adhesive sheet 48. The adhesive sheet 48 is provided with a pair of caulking notches 48*a* and a pair of terminal connection notches 48*b*. Both of the caulking notches 48*a* are provided so as to correspond to both of the caulking holes 47*a*, that is, both of the caulking projections 45, and the corresponding caulking projections 45 are capable of being passed therethrough. Both of the terminal connection notches 48*b* are provided corresponding to both of the terminal connection holes 47*b*, that is, both of the pin terminals 24*a*, and the corresponding pin terminals 24*a* are capable of being passed therethrough.

The circuit board 47 is electrically connected to the light source 21 by a pair of bonding wires 49 provided by wire bonding. The bonding wires 49 are provided forming a pair so as to bridge the connection terminals 31*b* of the sub-mount substrate 31 of the light source 21, which are attached to the convex surface part 43*a*, and the connection terminals 47*c* of the circuit board 47, which are attached to the concave surface part 43*b*. In the first embodiment, the bonding wires 49 are each electrically connected to a connection terminal 31*b* at one end and a connection terminal 47*c* at the other end by wire bonding using ultrasonic waves. Note that the light source 21 (the sub-mount substrate 31 thereof) and the circuit board 47 only need to be electrically connected, and the configuration is not limited to the configuration of the first embodiment.

The heat dissipating fin part 42 has a plurality of parallel fins 51 protruding from the heat dissipating surface 44 of the base part 41 toward the rear side in the optical axis direction. The parallel fins 51 are flat plates that are orthogonal to the up-down direction of the heat dissipating surface 44 of the base part 41, and are provided in side by side (in parallel) with a predetermined spacing in the up-down direction. That is, as a result of being flat plates, the parallel fins 51 each have flat outer surfaces above and below, and are provided in parallel with the outer surfaces facing each other. The number and thickness of the parallel fins 51 may be set as appropriate, and in the first embodiment, four fins are used having a thick plate shape (in which the ratio of the dimension in the up-down direction to the size in a plane orthogonal to the up-down direction is larger than that of the parallel fins 51A of the second embodiment).

The heat dissipating fin part 42 according to the first embodiment is provided with connecting fins 52. The connecting fins 52 bridge the parallel fins 51 in the parallelly arranged direction thereof, and two connecting fins are provided in the first embodiment. The two connecting fins 52 are positioned on the same straight line in the optical axis direction as the caulking projections 45 that are provided on the concave surface part 43*b* of the installation surface 43 (see FIG. 6). Both of the connecting fins 52 bridge the parallel fins 51 from above and below in the vicinity of the width direction end parts, that is, are bridging from the top parallel fin 51 and reach the bottom parallel fin 51 via the two middle parallel fins 51. As a result, the heat dissipating fin part 42 according to the first embodiment has the four parallel fins 51 and the two connecting fins 52 assembled in a grid pattern. Further, both of the caulking projections 45 according to the first embodiment are positioned on the same straight line in the optical axis direction as the positions where the corresponding connecting fins 52 overlap with the parallel fins 51, that is, the positions where the parallel fins 51 and the connecting fins 52 intersect (see FIG. 6).

In the heat dissipating member 22, as shown in FIG. 4, the pair of terminal holes 46 penetrate the base part 41, which results in both of the terminal holes 46 being positioned in the heat dissipating surface 44 below the bottom parallel fin 51. In addition, in the heat dissipating member 22, the heat dissipating surface 44 of the base part 41 is provided with a pair of positioning projections 53. The positioning projections 53 are positioned on the heat dissipating surface 44 outside the pair of terminal holes 46 in the width direction, and have a columnar shape protruding from the heat dissipating surface 44 toward the rear side in the optical axis direction.

Figure 5:
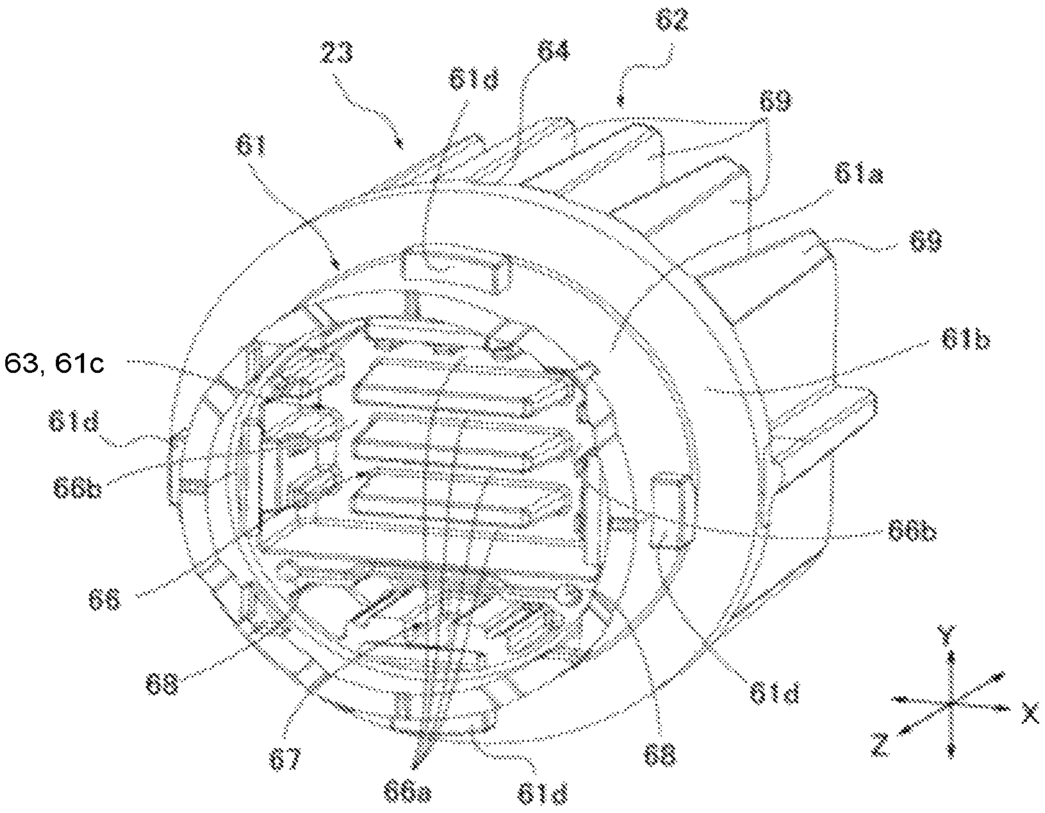
FIG. 5 is an explanatory diagram showing a socket of the light source unit when viewed from the attachment surface side.
Figure 6:
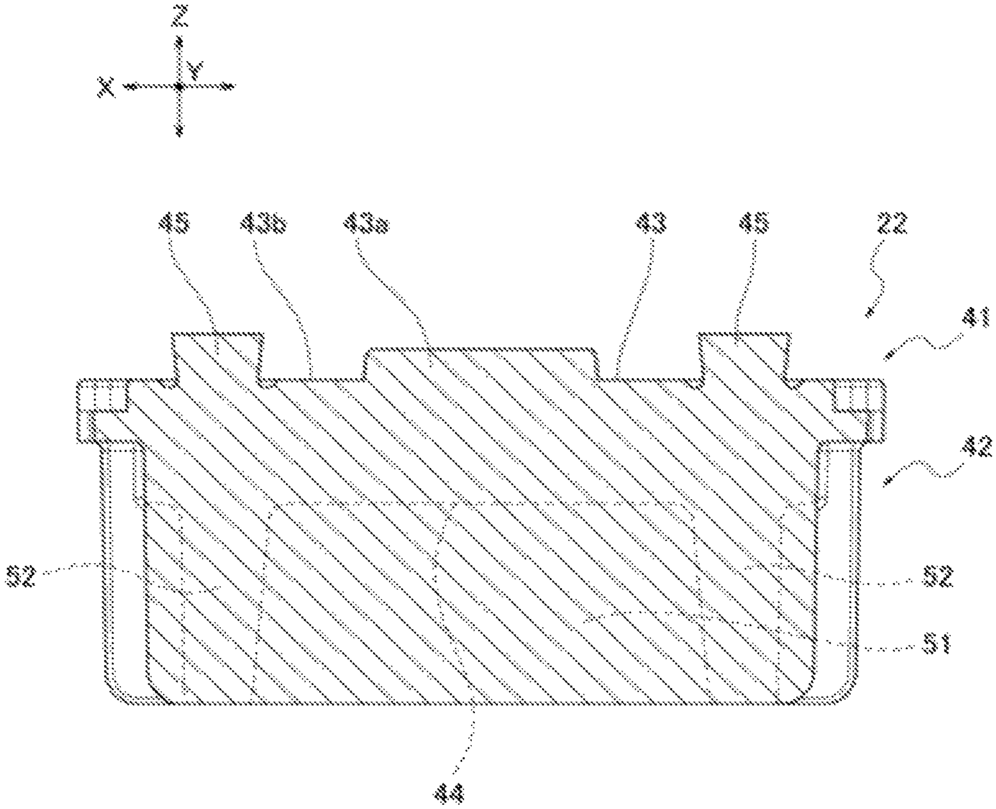
FIG. 6 is an explanatory diagram showing a cross-section obtained along line I-I in FIG. 3.

As shown in FIGS. 3 and 5, the socket 23 is made of a material having thermal conductivity, and is made of a resin member in the first embodiment. The socket 23 has a socket main body part 61 and a socket heat dissipating part 62, and has the function (provided mainly by the socket heat dissipating part 62) of releasing the heat transferred from the heat dissipating member 22 to the outside. The front side of the socket main body part 61 in the optical axis direction is an attachment surface 63, and the opposite side (rear side in the optical axis direction) is a heat dissipating surface 64 that is continuous with the socket heat dissipating part 62. The attachment surface 63 is provided with a cylindrical peripheral wall 61*a* having an outer diameter slightly smaller than the inner diameter of the attachment hole 11*a* of the lamp housing 11, a flange wall 61*b* protruding therefrom toward the outside along a plane orthogonal to the optical axis direction, and a bottom wall 61*c* that closes the rear side of the peripheral wall 61*a* in the optical axis direction. The socket main body part 61 is divided into an attachment surface 63 side and a heat dissipating surface 64 side by the bottom wall 61*c*.

The socket main body part 61 is provided with four attachment projections 61*d* protruding from the peripheral wall 61*a* toward the outside in a direction orthogonal to the optical axis direction. The four attachment projections 61*d* are provided at substantially equal intervals in the circumferential direction of the peripheral wall 61*a*, and are capable of being passed through the notch parts provided in the edge of the attachment hole 11*a* of the lamp housing 11. After being passed through the notch parts mentioned above, the attachment projections 61*d* are attached to the stopper parts as a result of changing the rotational posture of the socket main body part 61 with respect to the lamp housing 11, which enables the peripheral edge part of the attachment hole 11*a* and the sealing member 15 to be sandwiched in the space between the flange wall 61*b* (See FIG. 1). Consequently, the attachment projections 61*d* are capable of detachably attaching the socket 23, that is, the light source unit 20, to the lamp housing 11 via the sealing member 15 in cooperation with the flange wall 61*b*.

In the socket main body part 61, a fin groove part 66, an installation hole 67, and positioning holes 68 are provided on the inside of the peripheral wall 61*a* of the attachment surface 63. The fin groove part 66 is capable of having the heat dissipating fin part 42 fitted inside, and has an inverse shape to that of the heat dissipating fin part 42. That is, the fin groove part 66 has parallel grooves 66*a* that fit the four parallel fins 51, connecting grooves 66*b* that fit the two connecting fins 52, and are combined in a grid pattern. As a result, the fin groove part 66 is capable of accepting the heat dissipating fin part 42 so as to appropriately engage the heat dissipating fin part 42.

The installation hole 67 is a location where the power supply member 24 (see FIG. 3) is installed, and penetrates the bottom wall 61*c* in the optical axis direction. The power supply member 24 has the connector 16 on the power supply side (see FIG. 1) connected in a mechanically detachable and electrically disconnectable fashion, and supplies the power from the connector 16 to the light source unit 20. The power supply member 24 has a pair of pin terminals 24*a*, and power is capable of being supplied to the circuit board 47 as a result of the pin terminals 24*a* being electrically connected to the terminal connection holes 47*b*. The installation hole 67 has a shape that imitates the outer shape of the power supply member 24, and by fitting the power supply member 24 inside via an insulating material, the insulation of the power supply member 24 is ensured. This installation hole 67 communicates with an attachment location (the inner side thereof) provided on the heat dissipating surface 64. As a result of being provided in the installation hole 67, the power supply member 24 has a connection terminal on the rear side in the optical axis direction exposed inside the attachment location, and when the connector 16 (see FIG. 1) on the power source side is attached to the attachment location, the connection terminal is electrically connected to the connection terminal of the connector 16.

The positioning holes 68 form a pair so as to correspond to the pair of positioning projections 53 of the heat dissipating member 22, and are holes in which the positioning projections 53 can be inserted. The positioning holes 68 are positioned on the outside of the installation hole 67 in the width direction of the attachment surface 63, and are holes that extend toward the rear side in the optical axis direction. The positioning holes 68 determine the relative position of the heat dissipating member 22 and the socket 23 as a result of the corresponding positioning projections 53 being inserted inside. As a result, in the first embodiment, the pair of positioning projections 53 of the heat dissipating member 22 serve as heat dissipating-side positioning parts, and the pair of positioning holes 68 of the socket 23 serve as socket-side positioning parts. The position and number of heat dissipating-side positioning parts and socket-side positioning parts may be appropriately set as long they determine the relative position of the heat dissipating member 22 and the socket 23, and the projections and holes may be switched, and other configurations not limited to the configuration of the first embodiment are also possible.

The socket heat dissipating part 62 has a plurality of fins 69 that release (radiate) the heat transferred from the heat dissipating member 22 to the outside. The fins 69 are plate shaped and formed along a plane orthogonal to the width direction, and are arranged in parallel in the width direction while protruding from the heat dissipating surface 64 toward the rear side in the optical axis direction. As shown in FIG. 1, the heat dissipating surface 64 is provided with an attachment location in which the power source side connector 16 is inserted at a location in which the fins 69 are not provided. The attachment location has the connector 16 attached such that it is mechanically detachable, and when attached the connection terminal of the connector 16 is electrically connected to the connection terminal of the power supply member 24 (see FIG. 3) provided in the installation hole 67.

The light source unit 20 is assembled as follows. First, as shown in FIG. 3, the power supply member 24 is fitted in the installation hole 67 of the attachment surface 63 of the socket 23 via an insulating material. Furthermore, on the installation surface 43 of the base part 41 of the heat dissipating member 22, the light source 21 is attached to the central region of the convex surface part 43*a* via the adhesive layer 33, and the circuit board 47 is attached to the concave surface part 43*b* via the adhesive sheet 48. At this time, in the adhesive sheet 48 and the circuit board 47, the pair of caulking projections 45 of the concave surface part 43*b* are passed through the corresponding caulking notches 48*a* and caulking holes 47*a*, and the terminal connection holes 47*b* and the terminal connection notches 48*b* corresponding to the pair of terminal holes 46 of the concave surface part 43*b* are superimposed. Then, the circuit board 47 is more firmly fixed to the concave surface part 43*b* by flattening and plastically deforming, that is, caulking, the tip of both of the caulking projections 45.

Next, the pair of bonding wires 49 is arranged so as to bridge the connection terminals 31*b* of the sub-mount substrate 31 of the light source 21 and the connection terminals 47*c* of the circuit board 47. Then, both ends of the bonding wires 49 attached to the connection terminals 31*b* and the connection terminals 47*c* are electrically connected by wire bonding using ultrasonic waves. Then, a thermal conductor 71 is provided on the fin groove part 66 of the attachment surface 63 of the socket main body part 61 of the socket 23. The thermal conductor 71 is provided to increase the heat transfer between the heat dissipating fin part 42 of the heat dissipating member 22 and the fin groove part 66 of the socket 23, and a thermal grease is used in the first embodiment.

Then, inside the peripheral wall 61*a* of the socket main body part 61, the positioning projections 53 are inserted into the positioning holes 68 to attach the heat dissipating surface 64 to the attachment surface 63, and the heat dissipating member 22 is press-fitted into the socket 23. At the time of press-fitting, ultrasonic waves can be used as appropriate, that is, ultrasonic waves may or may not be used. At this time, because of the positioning action of the positioning projections 53 and the positioning holes 68, the heat dissipating fin part 42 of the heat dissipating surface 64 is fitted in the fin groove part 66 of the attachment surface 63, and the pin terminals 24*a* of the power supply member 24 provided in the installation hole 67 of the socket 23 are passed through the corresponding terminal connection holes 47*b* of the circuit board 47 via the corresponding terminal holes 46 of the socket main body part 61. Next, the light source unit 20 can be assembled by electrically connecting the pin terminals 24*a* to the terminal connection holes 47*b* with solder or the like.

The light source unit 20 is inserted into the attachment hole 11*a* of the lamp housing 11 from the light source 21 side in a state where the sealing member 15 is provided surrounding the peripheral wall 61*a* and attached to the flange wall 61*b*, and the attachment projections 61*d* of the socket 23 are passed through the notch parts provided on the edge of the attachment hole 11*a*. Then, as a result of changing the rotational posture of the socket main body part 61 with respect to the lamp housing 11 and the attachment projections 61*d* attaching to the corresponding stopper parts, the light source unit 20 is attached to the lamp housing 11 in a state where the sealing member 15 is sandwiched between the flange wall 61*b* and the peripheral edge part of the attachment hole 11*a*. The lighting fixture 10 for a vehicle is assembled as a result of the reflector 13 and the lamp lens 12 being attached to the lamp housing 11. In the lighting fixture 10 for a vehicle, the light source 21 and the circuit board 47 in the light source unit 20 are arranged inside the lamp chamber 14 via the attachment hole 11*a* of the lamp housing 11 and the attachment hole 13*b* of the reflector 13, and are on the reflection surface 13*a* side of the reflector 13. In the lighting fixture 10 for a vehicle, as a result of the connector 16 on the power source side (see FIG. 1) being attached to the attachment location of the socket 23 of the light source unit 20 that has been attached to the lamp housing 11, it is possible to supply power to the circuit board 47 via the power supply member 24, and the light source 21 can be appropriately illuminated and turned off.

In the lighting fixture 10 for a vehicle, because the heat dissipating fin part 42 of the heat dissipating member 22 is fitted in the fin groove part 66 of the socket 23, the heat generated by the light source 21 can be efficiently transferred from the heat dissipating member 22 to the socket 23, and the heat can be released from the socket 23 to the outside. Consequently, in the lighting fixture 10 for a vehicle, the light source 21 can be appropriately cooled and the light source 21 can be appropriately illuminated. In particular, because the lighting fixture 10 for a vehicle also has the socket heat dissipating part 62 (fins 69) provided in the socket 23, the heat transferred from the heat dissipating member 22 to the socket 23 is efficiently dissipated, and the heat dissipation of the heat dissipating member 22 can be promoted.

The following is a description of the problems with the conventional lighting fixture for a vehicle described in the prior art document. In the conventional lighting fixture for a vehicle, a plurality of fins are provided in a heat dissipating member, and a connector part (corresponding to the socket 23 of the present disclosure) is combined with the heat dissipating member by insert molding so as to fill the space between the fins. In the conventional lighting fixture for a vehicle, during insert molding, it is necessary to maintain the heat dissipating member provided with the plurality of fins in an appropriate position inside the mold by providing a support member that provides support inside the mold from the side in which the fins are provided. As a result, in the conventional lighting fixture for a vehicle, a through hole that passes through from the side on which the fins of the heat dissipating member are provided to the outside is formed in the connector part at the site in which the support member is pulled out, and an air passage between the outside and the substrate side is formed from the through hole via the heat dissipating member including the fins (the periphery thereof). Consequently, in the conventional lighting fixture for a vehicle, there is a possibility that moisture may enter the substrate side through the through hole, that is, into the space in which the light source provided on the substrate and the like are provided, and because this can result in fogging and water droplets and the like, there is room for improvement.

In contrast, in the lighting fixture 10 for a vehicle, the fin groove part 66, which fits the heat dissipating fin part 42 of the heat dissipating member 22 in the attachment surface 63 of the socket 23, and the positioning holes 68 are provided in the light source unit 20, and the pair of positioning projections 53 are also provided on the heat dissipating surface 44 of the heat dissipating member 22. As a result, in the lighting fixture 10 for a vehicle, the heat dissipating member 22 and the socket 23 are attached after being positioned by the positioning holes 68 and the positioning projections 53, which enables the heat dissipating fin part 42 to be fitted in the fin groove part 66. Consequently, in the lighting fixture 10 for a vehicle, because insert molding is not performed, formation of a through hole in the socket 23 can be prevented, and it is also possible to assemble the heat dissipating member 22 and the socket 23 as a result of the fin groove part 66 and the heat dissipating fin part 42 being engaged. As a result, the lighting fixture 10 for a vehicle is capable of preventing moisture from entering around the light source 21 and the circuit board 47, and the heat generated by the light source 21 can be efficiently released from the heat dissipating member 22.

Furthermore, in the lighting fixture 10 for a vehicle, the plurality of parallel fins 51 and the plurality of connecting fins 52 are provided in the heat dissipating fin part 42 in the light source unit 20. As a result, in the lighting fixture 10 for a vehicle, deformation of the heat dissipating fin part 42 can be suppressed when, in the heat dissipating member 22, the tips of both of the caulking projections 45 are caulked and fixed to the concave surface part 43*b* of the circuit board 47. This is because of the following reasons. In the heat dissipating member 22, when the tips of the caulking projections 45 are caulked, pressure is applied between the tips and the heat dissipating fin part 42 on the opposite side of the tips, which may cause the parallel fins 51 to collapse or bend when the heat dissipating fin part 42 only has the plurality of parallel fins 51. In contrast, in the lighting fixture 10 for a vehicle (light source unit 20), because the plurality of connecting fins 52 in the heat dissipating fin part 42 are provided so as to bridge the parallel fins 51 in the parallelly arranged direction of the parallel fins 51, the connecting fins 52 prevent a change in the spacing of the parallel fins 51. As a result, in the lighting fixture 10 for a vehicle, deformation of the heat dissipating fin part 42 can be suppressed even when the tips of both of the caulking projections 45 are caulked.

In particular, in the lighting fixture 10 for a vehicle, the two connecting fins 52 are provided on the same straight line as the caulking projections 45 in the optical axis direction. Here, because both of the caulking projections 45 are protruding in the optical axis direction, the pressure applied between the tips and the heat dissipating fin part 42 when the tips are caulked is along the optical axis direction. As a result, in the lighting fixture 10 for a vehicle, the pressure applied when the tips of the caulking projections 45 are caulked can be received by the connecting fins 52 on the same straight line as the caulking projections 45, and deformation of the heat dissipating fin part 42 including the connecting fins 52 can be effectively suppressed. In addition, both of the caulking projections 45 according to the first embodiment are positioned on the same straight line in the optical axis direction as the positions in which the parallel fins 51 and the connecting fins 52 intersect, deformation of the heat dissipating fin part 42 caused by the pressure applied when the tips of the caulking projections 45 are caulked can be more effectively suppressed.

Further, in the lighting fixture 10 for a vehicle, as a result of caulking the two caulking projections 45, the circuit board 47 is more firmly fixed to the concave surface part 43*b*. As a result, in the lighting fixture 10 for a vehicle, both ends of the pair of bonding wires 49 can be electrically connected to the connection terminals 31*b* of the light source 21 and the connection terminals 47*c* of the circuit board 47 by wire bonding using ultrasonic waves. This is because, when the circuit board 47 is attached to the concave surface part 43*b* using only the adhesive sheet 48, it may fall out of the concave surface part 43*b* or become displaced during wire bonding using ultrasonic waves. The same effect can be obtained with respect to shocks (ultrasonic vibrations and the like) when attaching the heat dissipating member 22 and the socket 23, and vibrations when the lighting fixture 10 for a vehicle is mounted on a vehicle. Consequently, in the lighting fixture 10 for a vehicle, the light source 21 and the circuit board 47 can be electrically connected at an appropriate position, and the desired light can be emitted.

Also, in the lighting fixture 10 for a vehicle, the parallel fins 51 have a thick plate shape. As a result, in the lighting fixture 10 for a vehicle, compared to a case where a thin plate shape is used (parallel fins 51A according to the second embodiment), the strength of the heat dissipating fin part 42 can be increased, and the heat capacity can be ensured. Furthermore, in the lighting fixture 10 for a vehicle, the connecting fins 52 are provided so as to bridge the thick plate shaped parallel fins 51. Consequently, in the lighting fixture 10 for a vehicle, compared to a case where only the parallel fins 51 are provided, the surface area of the heat dissipating fin part 42 can be increased, and the heat generated by the light source 21 can be more efficiently released from the heat dissipating member 22.

The lighting fixture 10 for a vehicle according to the first embodiment provides each of the following operational effects.

In the lighting fixture 10 for a vehicle, the heat dissipating member 22 includes the heat dissipating fin part 42 and the heat dissipating-side positioning parts (positioning projections 53), and the socket 23 includes the fin groove part 66 and the socket-side positioning parts (positioning holes 68). As a result, in the lighting fixture 10 for a vehicle, the heat dissipating member 22 and the socket 23 are attached after being positioned by the heat dissipating-side positioning parts and the socket-side positioning parts, which enables the heat dissipating fin part 42 to be fitted in the fin groove part 66. As a result, because insert molding is not performed, the lighting fixture for a vehicle is capable of preventing the formation of a through hole in the socket 23, preventing moisture from entering around the light source 21 and the circuit board 47, and also, the heat generated by the light source 21 can be efficiently released from the heat dissipating member 22.

The lighting fixture 10 for a vehicle is provided with the thermal conductor 71 between the heat dissipating fin part 42 and the fin groove part 66. As a result, the lighting fixture 10 for a vehicle can suppress the formation of a space between the fitted fin groove part 66 and the heat dissipating fin part 42, and is capable of more efficiently releasing the heat generated by the light source 21 from the heat dissipating member 22.

In the lighting fixture 10 for a vehicle, the heat dissipating fin part 42 has the plurality of parallel fins 51 having a flat plate shape that are arranged in parallel with flat outer surfaces thereof facing each other. As a result, in the lighting fixture 10 for a vehicle, the heat dissipating fin part 42 can be made a simple shape while ensuring the surface area, which simplifies the fitting to the fin groove part 66 and also enables the heat generated by the light source 21 to be more efficiently released from the heat dissipating member 22.

In the lighting fixture 10 for a vehicle, the heat dissipating fin part 42 has the connecting fins 52 protruding from the heat dissipating surface 44 while also bridging the parallelly arranged direction of the plurality of parallel fins 51. Consequently, in the lighting fixture 10 for a vehicle, the strength of the heat dissipating fin part 42 is ensured, and compared to a case where only the parallel fins 51 are provided, the surface area of the heat dissipating fin part 42 can be increased.

The lighting fixture 10 for a vehicle has the caulking holes 47*a* provided in the substrate (circuit board 47) and has the caulking projections 45 protruding from the installation surface 43 of the heat dissipating member 22. As a result, in the lighting fixture 10 for a vehicle, the substrate can be more firmly fixed to the installation surface 43 of the heat dissipating member 22 by caulking the tips of the caulking projections 45 in a state where the caulking projections 45 have been passed through the caulking holes 47*a*.

In the lighting fixture 10 for a vehicle, the caulking projections 45 are provided on the same straight line as the connecting fins 52 in a direction orthogonal to the substrate (circuit board 47). As a result, in the lighting fixture 10 for a vehicle, deformation of the heat dissipating fin part 42 can be suppressed when the tips of the caulking projections 45 are caulked.

Therefore, the lighting fixture 10 for a vehicle according to the first embodiment, which represents a lighting fixture for a vehicle according to the present disclosure, is capable of efficiently releasing heat from the light source 21 while inhibiting moisture from entering on the light source 21 side.

Second Embodiment

Next, a lighting fixture 10A for a vehicle according to a second embodiment, which is an embodiment of the present disclosure, will be described using FIGS. 7 to 10. In the lighting fixture 10A for a vehicle, the configuration of the light source unit 20 of the lighting fixture 10 for a vehicle according to the first embodiment has been changed. Because the lighting fixture 10A for a vehicle is the same as the lighting fixture 10 for a vehicle according to the first embodiment in the basic concept and configuration, those parts having the same configuration are denoted by the same reference numerals, and detailed descriptions are omitted.

Figure 7:
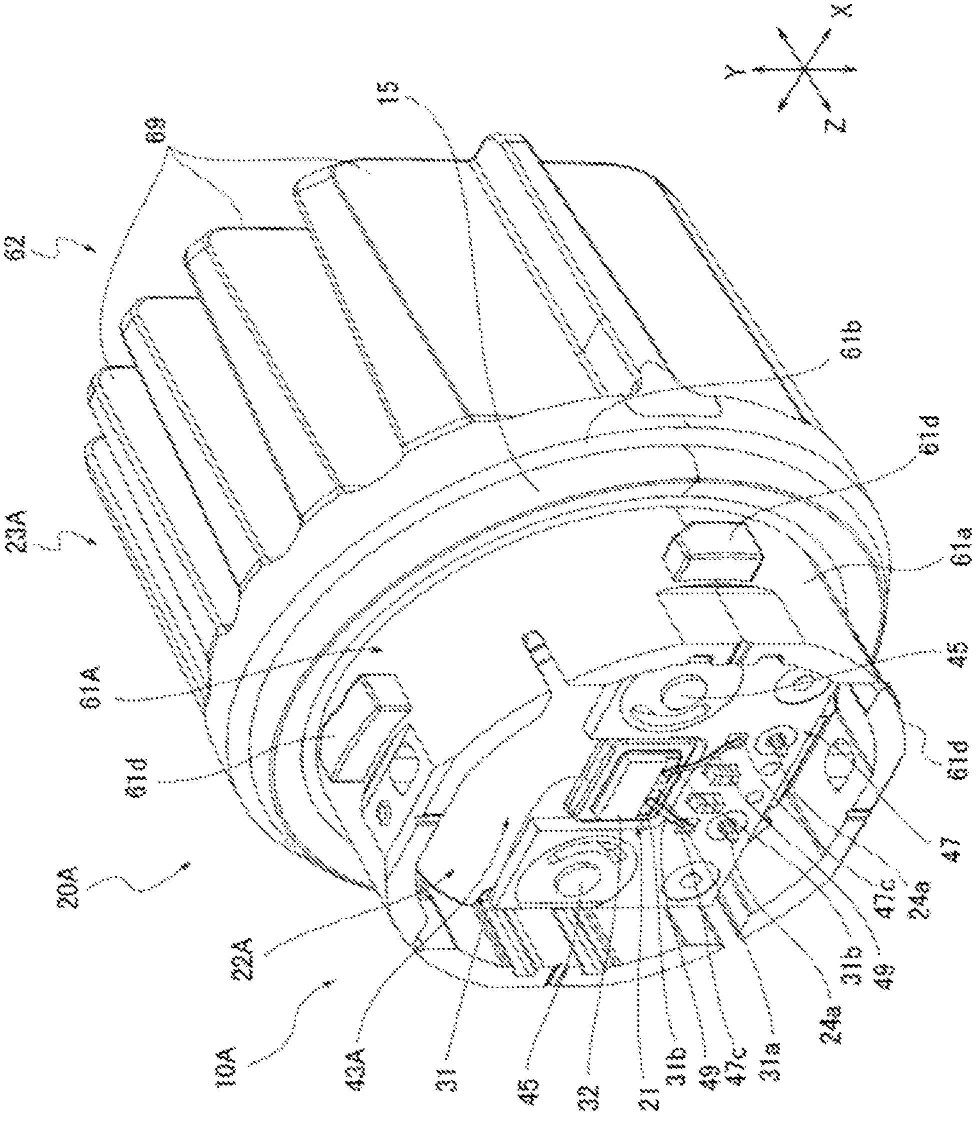
FIG. 7 is an explanatory diagram showing a light source unit of a lighting fixture for a vehicle according to a second embodiment.
Figure 8:
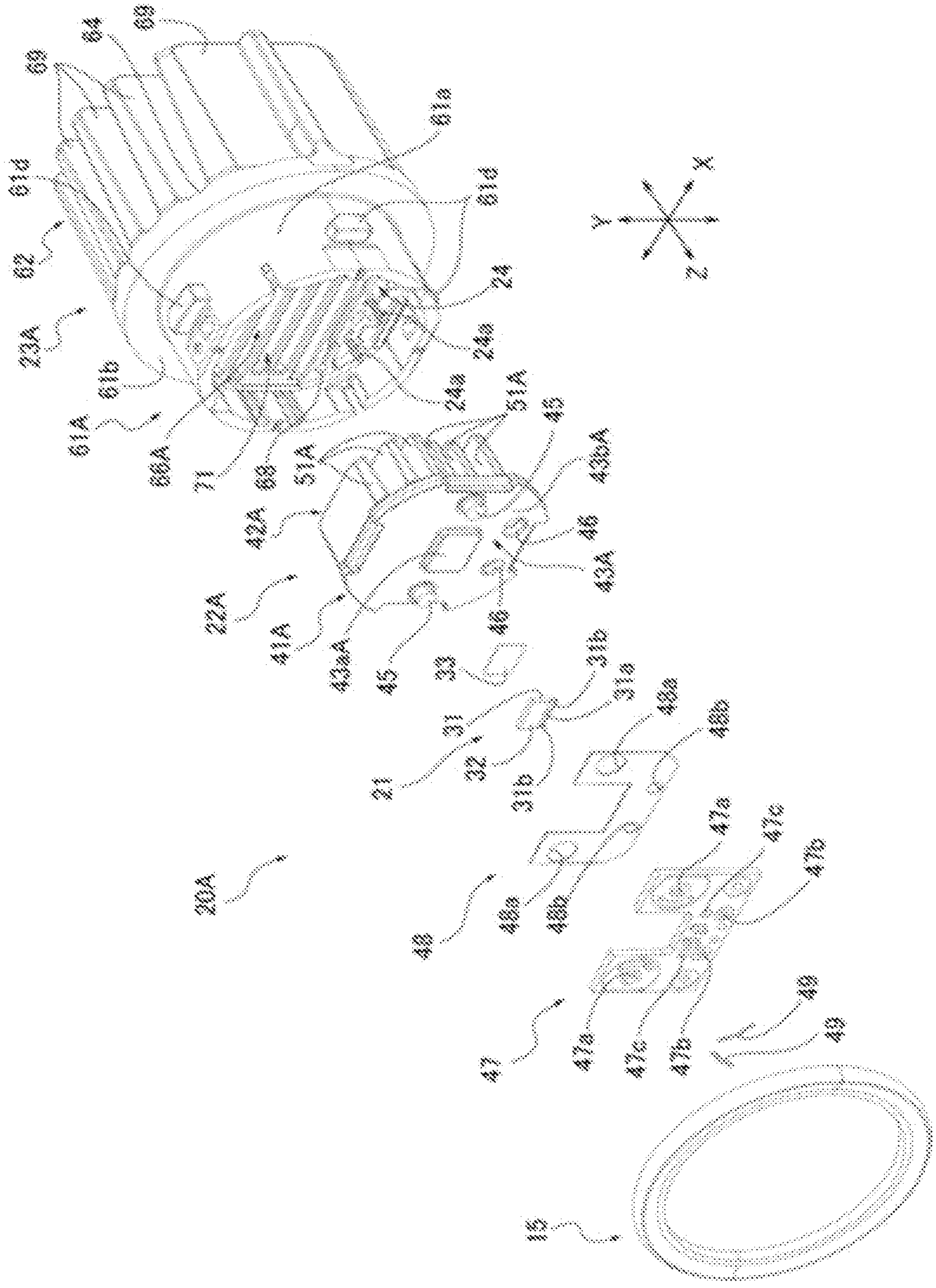
FIG. 8 is an explanatory diagram showing an exploded view of the configuration of the light source unit according to the second embodiment.
Figure 9:
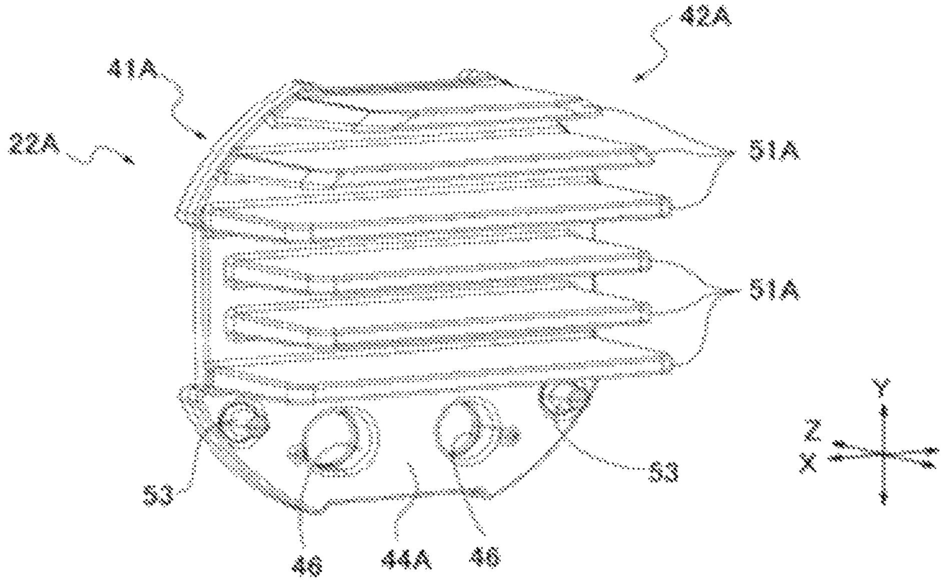
FIG. 9 is an explanatory diagram showing a heat dissipating member according to the second embodiment when viewed from the heat dissipating surface side.
Figure 10:
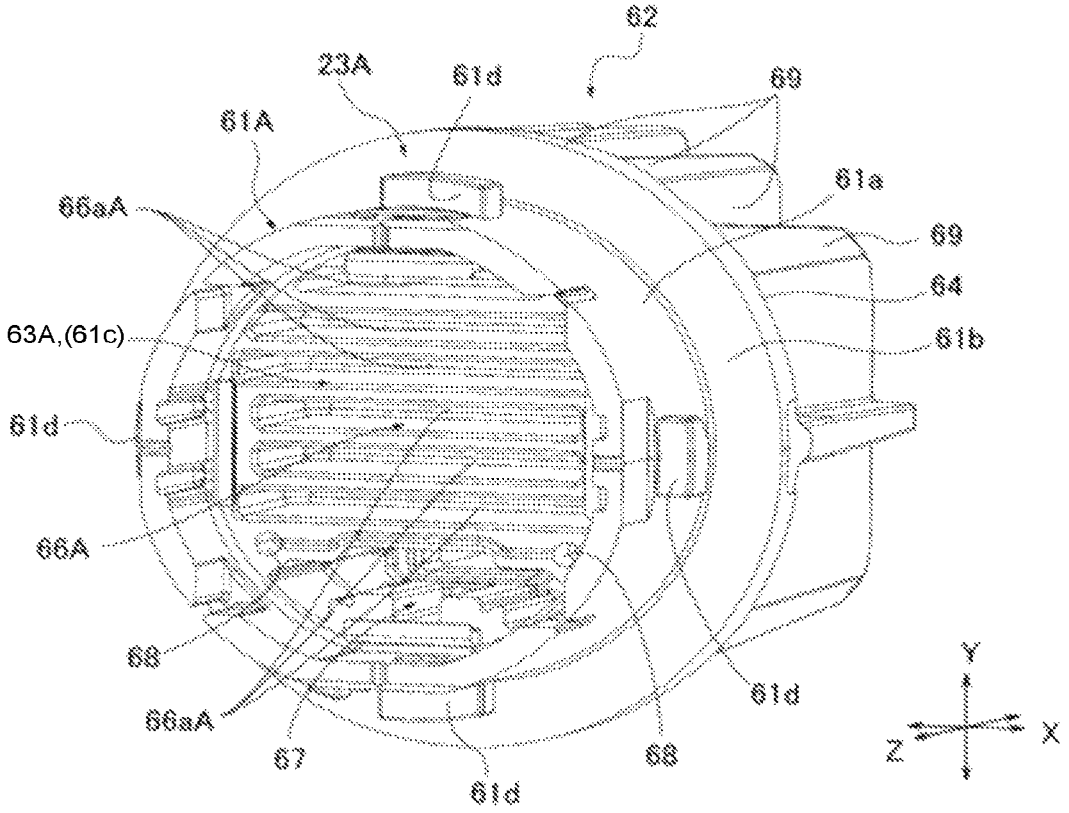
FIG. 10 is an explanatory diagram showing a socket according to the second embodiment when viewed from the attachment surface side.

The lighting fixture 10A for a vehicle according to the second embodiment includes the light source unit 20A shown in FIGS. 7 and 8. The light source unit 20A differs from the light source unit 20 in the configurations of the heat dissipating member 22A and the socket 23A.

In the heat dissipating member 22A, the convex surface part 43*a*A on the installation surface 43A of the base part 41A has a substantially equal area to that of the light source 21 when viewed from the front side in the optical axis direction. That is, unlike the convex surface part 43*a* in the first embodiment, the convex surface part 43*a*A does not extend above the location in which the light source 21 is installed. As a result, the concave surface part 43*b*A has a shape that surrounds the convex surface part 43*a*A. Except for this, the installation surface 43A of the heat dissipating member 22A has the same configuration as the installation surface 43 of the heat dissipating member 22 according to the first embodiment, and the light source 21, the circuit board 47, and both of the bonding wires 49 are attached in the same manner as in the first configuration.

Furthermore, in the heat dissipating member 22A, the configuration of the heat dissipating fin part 42A on the heat dissipating surface 44A is different to that of the heat dissipating fin part 42 according to the first embodiment. Although the heat dissipating fin part 42A has the plurality of parallel fins 51A protruding from the heat dissipating surface 44A toward the rear side in the optical axis direction, there is no equivalent component to the connecting fins 52 according to the first embodiment. The parallel fins MA are flat plates that are orthogonal to the up-down direction of the heat dissipating surface 44A, and are provided in side by side (in parallel) with a predetermined spacing in the up-down direction. That is, as a result of being flat plates, the parallel fins 51A each have flat outer surfaces above and below, and are provided in parallel with the outer surfaces facing each other. The number of parallel fins 51A is six in the second embodiment, and are thinner (thin plate shape) than the connecting fins 52 according to the first embodiment.

In the socket 23A, the fin groove part 66A in the attachment surface 63A of the socket main body part 61A has an inverse shape to the heat dissipating fin part 42A. That is, the fin groove part 66A has parallel grooves 66*a*A that are parallel in the up-down direction which fit the six parallel fins 51. As a result, the fin groove part 66A is capable of accepting the heat dissipating fin part 42A so as to appropriately engage the heat dissipating fin part 42A.

Next, the assembly and operation of the lighting fixture 10A for a vehicle will be described. The lighting fixture 10A for a vehicle can be assembled in the same manner as the lighting fixture 10 for a vehicle according to the first embodiment. In the lighting fixture 10A for a vehicle, like the lighting fixture 10 for a vehicle according to the first embodiment, the heat dissipating fin part 42A of the heat dissipating member 22A is fitted in the fin groove part 66A of the socket 23A without performing insert molding. As a result, the lighting fixture 10A for a vehicle is capable of preventing moisture from entering around the light source 21 and the circuit board 47, and the heat generated by the light source 21 can be efficiently released from the heat dissipating member 22A to the socket 23A on the outside.

The lighting fixture 10A for a vehicle according to the second embodiment provides each of the following operational effects. Because the lighting fixture 10A for a vehicle basically has the same configuration as the lighting fixture 10 for a vehicle according to the first embodiment, the same effects as the first embodiment are obtained.

In addition, in the lighting fixture 10A for a vehicle, the heat dissipating fin part 42A in the light source unit 20A has the plurality of parallel fins 51A protruding from the heat dissipating surface 44A toward the rear side in the optical axis direction. As a result, compared to the lighting fixture 10 for a vehicle according to the first embodiment, the lighting fixture 10A for a vehicle can simplify the shape of the heat dissipating fin part 42A and the fin groove part 66A, which enables the production cost to be suppressed and the heat dissipating fin part 42A can be more reliably fitted in the fin groove part 66A. Furthermore, in the lighting fixture 10A for a vehicle, the parallel fins 51A in the light source unit 20A have a thin plate shape, which enables the surface area to be increased compared to the parallel fins 51 having a thick plate shape as in the first embodiment.

Therefore, the lighting fixture 10A for a vehicle according to the second embodiment, which represents a lighting fixture for a vehicle according to the present disclosure, is capable of efficiently releasing heat from the light source 21 while inhibiting moisture from entering on the light source 21 side.

The lighting fixture for a vehicle according to the present disclosure has been described above based on the embodiments, but specific configurations are not limited to the embodiments, and design modifications, additions, and the like, are allowable without departing from the gist of the invention according to the scope of the claims.

Note that, in each of the embodiments, the thermal conductor 71 is provided between the heat dissipating fin part 42 or 42A and the fin groove part 66 or 66A. However, as long as the heat dissipating fin part 42 or 42A is fitted in the fin groove part 66 or 66A, the thermal conductor 71 does not have to be provided, and the configuration is not limited to those of the embodiments.

Furthermore, in the embodiments, the sub-mount type light source 21 is used and is electrically connected to the circuit board 47 by the pair of bonding wires 49 provided by wire bonding. However, as long as the light source is attached to the heat dissipating member 22 or 22A, and is illuminated and turned off by the supply of power from the connector 16 on the power source side, which is attached to the socket 23 or 23A, the configuration is not limited to those of the embodiments.

In addition, in the embodiments, the heat dissipating fin parts 42 and 42A are configured as described above. However, as long as the heat dissipating fin part has a so-called fin shape that expands the surface area in order to increase the heat dissipation performance of the heat dissipating member 22 or 22A, the configuration is not limited to those of the embodiments. Also, in the embodiments, the fin groove parts 66 and 66A are configured as described above. However, as long as the fin groove part allows the heat dissipating fin part to be fitted inside, that is, has an inverse shape to the heat dissipating fin part, the configuration is not limited to those of the embodiments.

DESCRIPTION OF REFERENCE NUMERALS

10, 10A Lighting fixture for a vehicle
21 Light source
22, 22A Heat dissipating member
23, 23A Socket
42, 42A Heat dissipating fin part
43, 43A Installation surface
44, 44A Heat dissipating surface
45 Caulking projection
47 Circuit board (as an example of a substrate)
47*a* Caulking hole
51, 51A Parallel fin
52 Connecting fin
53 Positioning projection (as an example of a heat dissipating-side positioning part)
63, 63A Attachment surface
66, 66A Fin groove part
68 Positioning hole (as an example of a socket-side positioning part)
71 Thermal conductor

The invention claimed is:

1. A lighting fixture for a vehicle comprising:

a light source;

a heat dissipating member which dissipates heat from the light source, the light source being placed on an installation surface of the heat dissipating member; and a socket including an attachment surface on which the heat dissipating member is attached; wherein the heat dissipating member includes a heat dissipating surface which is on a side opposite to the installation surface and faces the attachment surface of the socket when the heat dissipating member is attached to the socket, the heat dissipating surface including a first area in which a heat dissipating fin part protrudes from the heat dissipating surface, and a a second area provided lower than the heat dissipating fin part, in which a heat dissipating-side positioning part is provided at a predetermined position, and the attachment surface including a fin groove part into which the heat dissipating fin part fits so that the heat dissipating fin part is located in the socket when the heat dissipating member is attached to the socket, and a socket-side positioning part provided at a position corresponding to the predetermined position of the heat dissipating-side positioning part to determine a relative position of the heat dissipating member to the socket.

2. The lighting fixture for a vehicle according to claim 1, wherein a thermal conductor is provided between the heat dissipating fin part and the fin groove part.

3. The lighting fixture for a vehicle according to claim 1, wherein the heat dissipating fin part is provided with a plurality of parallel fins having a flat plate shape that are arranged in parallel with flat outer surfaces thereof facing each other.

4. The lighting fixture for a vehicle according to claim 3, wherein the heat dissipating fin part is provided with a connecting fin protruding from the heat dissipating surface while bridging the plurality of parallel fins in a parallelly arranged direction thereof.

5. The lighting fixture for a vehicle according to claim 4, wherein the light source is a sub-mount type light-emitting element, the installation surface is provided with a substrate, which is in a different position to the light source and is electrically connected to the light source, the substrate is provided with a caulking hole that penetrates therethrough, and the heat dissipating member is provided with a caulking projection protruding from the installation surface, the caulking projection being capable of being passed through the caulking hole.

6. The lighting fixture for a vehicle according to claim 5, wherein the caulking projection is provided on a same straight line as the connecting fin in a direction perpendicular to the substrate.

7. The lighting fixture for a vehicle according to claim 1, wherein the heat dissipating-side positioning part is one of a projection and a hole in which the projection can be inserted, and the socket-side positioning part is the other of the projection and the hole.

* * * * *